United States Patent
Brooke et al.

(10) Patent No.: US 7,685,135 B2
(45) Date of Patent: *Mar. 23, 2010

(54) DATABASE FACILITY FOR XML SERVER PAGES LANGUAGE

(75) Inventors: David M. Brooke, Hemel Hempstead (GB); Steve M. Saxon, Bracknell (GB)

(73) Assignee: Dell Products L.P., Round Rock, TX (US)

( * ) Notice: Subject to any disclaimer, the term of this patent is extended or adjusted under 35 U.S.C. 154(b) by 707 days.

This patent is subject to a terminal disclaimer.

(21) Appl. No.: 10/835,334

(22) Filed: Apr. 29, 2004

(65) Prior Publication Data

US 2004/0210556 A1  Oct. 21, 2004

Related U.S. Application Data

(63) Continuation of application No. 09/399,506, filed on Sep. 20, 1999, now Pat. No. 6,763,343.

(51) Int. Cl.
*G06F 7/00* (2006.01)
*G06F 15/00* (2006.01)
*G06F 17/00* (2006.01)

(52) U.S. Cl. .................. 707/100; 715/513; 715/522

(58) Field of Classification Search ............ 715/513, 715/523, 522, 500; 707/3–5, 100–102
See application file for complete search history.

(56) References Cited

U.S. PATENT DOCUMENTS

| | | | | |
|---|---|---|---|---|
| 6,012,098 A * | 1/2000 | Bayeh et al. | ............. | 709/246 |
| 6,272,673 B1 * | 8/2001 | Dale et al. | ............. | 717/100 |
| 6,424,979 B1 * | 7/2002 | Livingston et al. | ....... | 715/206 |
| 6,446,110 B1 * | 9/2002 | Lection et al. | ........... | 709/203 |
| 6,476,833 B1 * | 11/2002 | Moshfeghi | ............... | 715/854 |
| 6,480,865 B1 * | 11/2002 | Lee et al. | ................ | 715/234 |
| 6,535,896 B2 * | 3/2003 | Britton et al. | ............ | 715/239 |
| 6,585,778 B1 * | 7/2003 | Hind et al. | .............. | 715/235 |
| 6,589,291 B1 * | 7/2003 | Boag et al. | .............. | 715/235 |
| 6,826,597 B1 * | 11/2004 | Lonnroth et al. | .......... | 709/207 |
| 7,233,940 B2 * | 6/2007 | Bamberger et al. | ......... | 707/3 |

* cited by examiner

*Primary Examiner*—Hung T Vy
(74) *Attorney, Agent, or Firm*—Baker Botts L.L.P.

(57) ABSTRACT

A method and computer program product for generating XML documents that include data content and style information from a plurality of data sources. A first file includes control statements that reference at least one resource containing display information. A server pages processor executes a script that includes a control statement referencing the first file, wherein the first file includes references to a plurality of resources containing display information. The resources may reside in at least two different locations in a computer system network.

6 Claims, 3 Drawing Sheets

DATABASE FACILITY FOR XML SERVER PAGES LANGUAGE

CROSS REFERENCE TO RELATED APPLICATION

This application is a continuation of U.S. patent application Ser. No. 09/399,506, which was filed on Sep. 20, 1999 now U.S. Pat. No. 6,763,343 by the same inventors as the instant application.

BACKGROUND OF THE INVENTION

1. Field of the Invention

This invention generally relates to page display software languages for programmers on the World Wide Web. More specifically, this invention relates to providing uniform content and style information from a central location to display pages.

2. Description of the Related Art

A significant development in computer networking is the Internet, which is a sophisticated worldwide network of computer systems. A user at an individual PC (i.e., workstation) that wishes to access the Internet typically does so using a software application known as a web browser. A web browser uses a standardized interface protocol, such as HyperText Transfer Protocol (HTTP), to make a connection via the Internet to other computers known as web servers, and to receive information from the web servers that is displayed on the user's display. Information displayed to the user is typically organized into pages that are constructed using a specialized language such as Hypertext Markup Language (HTML), Extensible Markup Language (XML), and Wireless Markup Language (WML), hereinafter (markup languages). Markup languages are typically based on the Standard Generalized Markup Language (SGML) that was created with the original purpose of having one standard language that could be used to share documents among all computers, regardless of hardware and operating system configurations. To this end, markup language files use a standard set of code tags embedded in their text that describes the elements of a document. The web browser interprets the code tags so that each computer having its own unique hardware and software capabilities is able to display the document while preserving the original format of the document. Each document typically resides in a separate file on the server.

For companies doing world-wide business over the Internet, web pages are translated into the appropriate language and stored as hard-coded HTML and/or active server pages (ASP). Further, business units in different countries or regions often target specific products and/or services for that particular area, requiring customized information on the web pages. Updating the pages may quickly entail an overwhelming amount of overhead for the business organization. Additional overhead is incurred with the proliferation of specialized mark-up languages having unique syntax for different types of computer systems, such as WML for portable, wireless, telephones and personal communication systems. In many instances, the format or style of the page may be common across servers, especially when a company strives for a unified appearance across their pages, but data on the page may be unique to a specific server.

There are a number of different web browsers available, each supporting their own extensions to markup languages such as HTML. Thus, a document written for one browser may not be interpreted as intended on another browser if it does not support the same extensions. In many situations, software developers are forced to create unique documents for each browsers, or to include logic in the markup language that bypasses or executes certain portions of code, depending on which browsers are being supported. This adds another layer of complexity to developing and updating these documents.

XML was designed to meet the requirements of large-scale web content providers for industry-specific markup (i.e., encoded descriptions of a document's storage layout and logical structure), vendor-neutral data exchange, media-independent publishing, one-on-one marketing, workflow management in collaborative authoring environments, and the processing of web documents by intelligent clients. XML is also used in certain metadata applications. XML supports European, Middle Eastern, African, and Asian languages, and all conforming processors support the Unicode character set encodings.

It is therefore desirable to provide a mechanism for using XML that allows customized web pages to share format and other content/behavior information while providing capability to store data in structured, but flexible collections associated with owners. It is also desirable for the markup language to allow users to recombine and re-use data on many different pages, and to draw on different sources for data. It is also desirable for such a system to support standards provided in XML.

In the prior art, there are a variety of systems that provide limited content management capability. Some commercially available content management systems such as Vignette, StoryServer and Inso Dynabase, typically use templates or page components that are dynamically populated from system query language (SQL) databases and recombined into pages using pre-defined templates. These systems generally fit well with highly structured sites having many identically formatted pages, such as a news site, however, the template structures are generally fixed and not flexible. Further, in these systems, the data storage paradigm is based upon filling named slots in the templates, which does not lend itself to a flexible data format that prioritizes the expression of data and its relationships. The template model for such systems is typically based on either Java, or a scripting language such as VBScript or Tcl/Tk, and limited support is typically provided for XML as a data type.

Another variety of systems that provide limited content management capability are Internet application servers such as COLDFUSION® made by Macromedia, Inc. of San Francisco, Calif. These application servers are primarily designed to support development of interactive applications. Most of the site template structures are hard-coded as server scripts, often using a mixture of standard HTML tags and proprietary tags that are pre-processed on the server. Each script is independent of the others; there is no inheritance mechanism. Even though the scripts are based on tags, the scripts are not well-formed XML, but rather customized HTML, and the separation of form and data is limited. Further, use of XML in these systems is limited to complete source data files.

Web-enabled object/XML databases such as OBJECTSTORE®/EXCELON® (made by Progress Software Corporation, Bedford, Mass.), POET® (manufactured by Poet Software GmbH, Hamburg, Germany), etc., provide a platform for high-performance application development around a flexible repository, but provide limited development tools. The data modeling capabilities are flexible and well-suited to free-form web content, however, and there is no high-level scripting language to provide a framework for managing content.

Traditional non-web content management systems such as INTERLEAF® (made by Interleaf, Inc. of Waltham, Mass.), ARBORTEXT® (made by ArborText of Ann Arbor, Mich.), and TEXCEL® (made by Texcel Systems, Inc. of Wayland, Mass.) are designed for generic, media-neutral content management, and are frequently SGML-based, therefore leading to a natural evolution towards XML. These systems are typically deployed for maintaining major documentation projects. The output of these systems is normally customized for a particular customer, and may be delivered online, on compact disc, or in print. These systems are designed to assemble explicit documents, however, and do not include capabilities for providing data-driven, script-aided document delivery.

One other system for populating pages includes using ASP and SQL with content selection rules supported by personalization/recommendation software components. This is a relatively simple approach to content management, however, most of the site template structures are hard-coded in HTML, and thus there is no inheritance mechanism. Additionally, most of the data is embedded in the pages, and pages are personalized by populating pre-defined slots with targeted data. Mass customization is possible, but there is little flexibility.

SUMMARY OF THE INVENTION

In one embodiment, the present invention provides a method for generating XML documents that include data content and style information from a plurality of data sources. A first file includes control statements that reference at least one resource containing display information. A server pages processor executes a script that includes a control statement referencing the first file, wherein the first file includes references to a plurality of resources containing display information. The resources may reside in at least two different locations in a computer system network.

One feature for reducing duplication of display information in the present invention includes defining default display information in one location that may be included with the display information for resources in other locations.

Another feature for reducing duplication of display information in the present invention includes defining a resource class that is associated with at least one resource. Default display information may be provided in one location with the class, and the default display information is then included with the display information for each resource associated with the class.

Another feature for reducing duplication of display information in the present invention includes generating a marker resource that associates a name with one or more resources. A link is then associated with the marker resource and the link may be specified to refer to the at least one resource. This allows two or more resources to refer to the link to access the display information for the at least one resource.

Another feature in the present invention includes defining a variant for the at least one resource, wherein the variant provides a reference to override display information for the at least one resource.

In another embodiment, the present invention is implemented in program instructions and distributed as a computer program product.

In another embodiment, the present invention is implemented in a computer system that executes program instructions for generating XML documents that include display information from a plurality of data sources.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

Overview of Preliminary Concepts and Definitions

While the Internet is used herein as an example of how the present invention is utilized, it is important to recognize that the present invention is also applicable to other information networks that utilize documents with content represented in a markup language. For those who are not familiar with XML, the Internet, the World Wide Web, web servers, and web browsers, a brief overview of these concepts is presented here.

Figure 1:
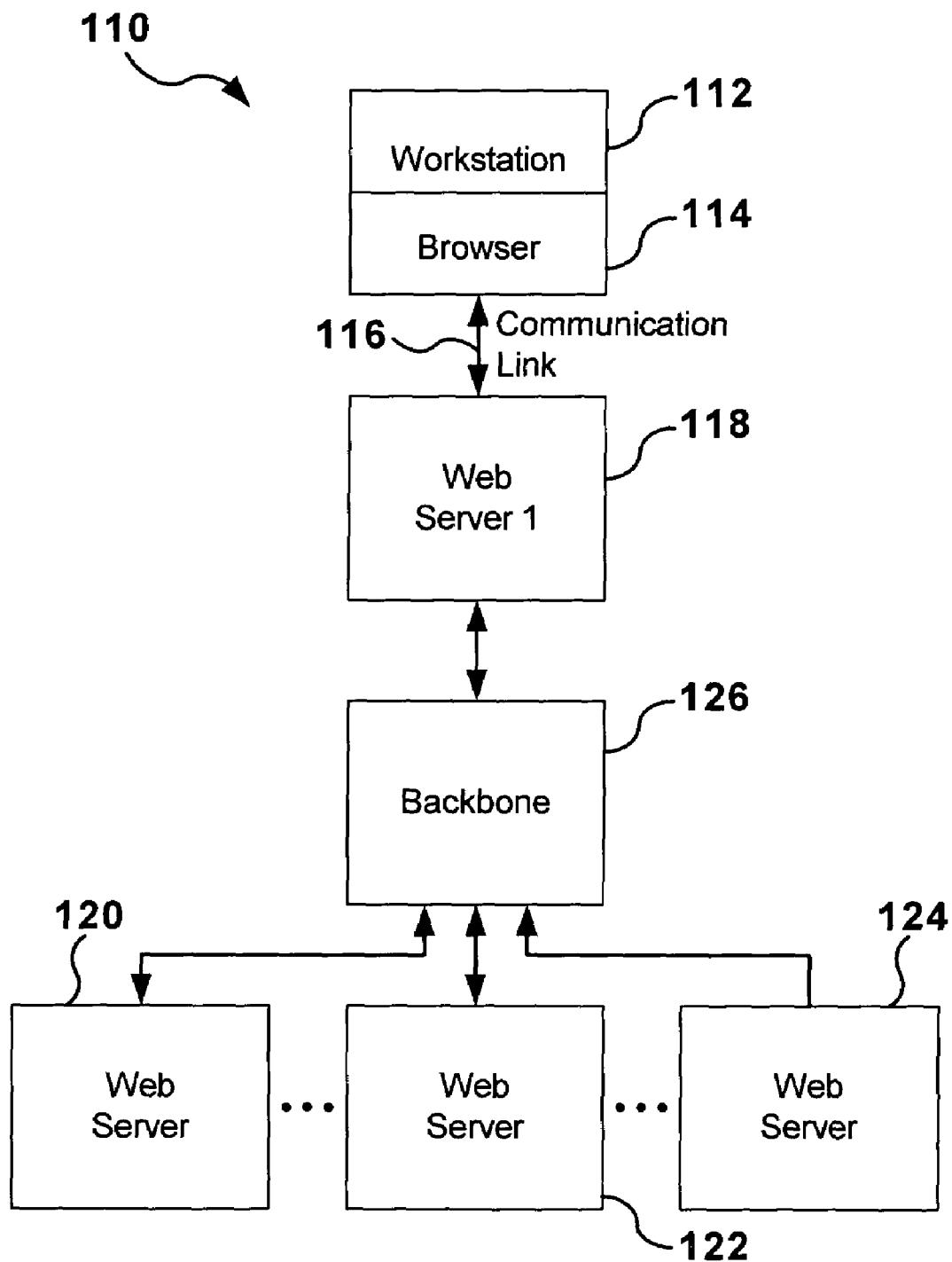
FIG. 1 is a block diagram of a computerized information network with which the present invention may be utilized.

An example of a typical Internet connection found in the prior art is shown in FIG. 1. A user that wishes to access information on the Internet typically has a computer workstation 112, also referred to as "the client workstation", that executes an application program known as a web browser 114. Workstation 112 establishes a communication link 116 with web server 118 such as a dial-up wired connection with a modem, a direct link such as a T1 or ISDN line, a wireless connection through a cellular or satellite network, or a local data transport system such as Ethernet or token ring over a local area network. When the user enters a request for information by entering/commands in web browser 114, workstation 112 sends a request for information, such as a search for documents pertaining to a specified topic, or a specific web page to web server 118. Each web server 118, 120, 122, 124 on the Internet has a known address which the user must supply to the web browser 114 in order to connect to the appropriate web server 118, 120, 122, or 124. If the information is available on the user's web server 118, a central link such as backbone 126 allows web servers 118, 120, 122, 124 to communicate with one another to supply the requested information. Because web servers 118, 120, 122, 124 can contain more than one web page, the user will also specify in the address which particular web page he wants to view. The address, also known as a universal resource locator (URL), of a home page on a server is a series of numbers that indicate the server and the location of the page on the server, analogous to a post office address. For simplicity, a domain name system was developed that allows users to specify servers and documents using names instead of numbers. A URL may further specify a particular page in a group of pages belonging to a content provider by including additional information at the end of a domain name.

Figure 1A:
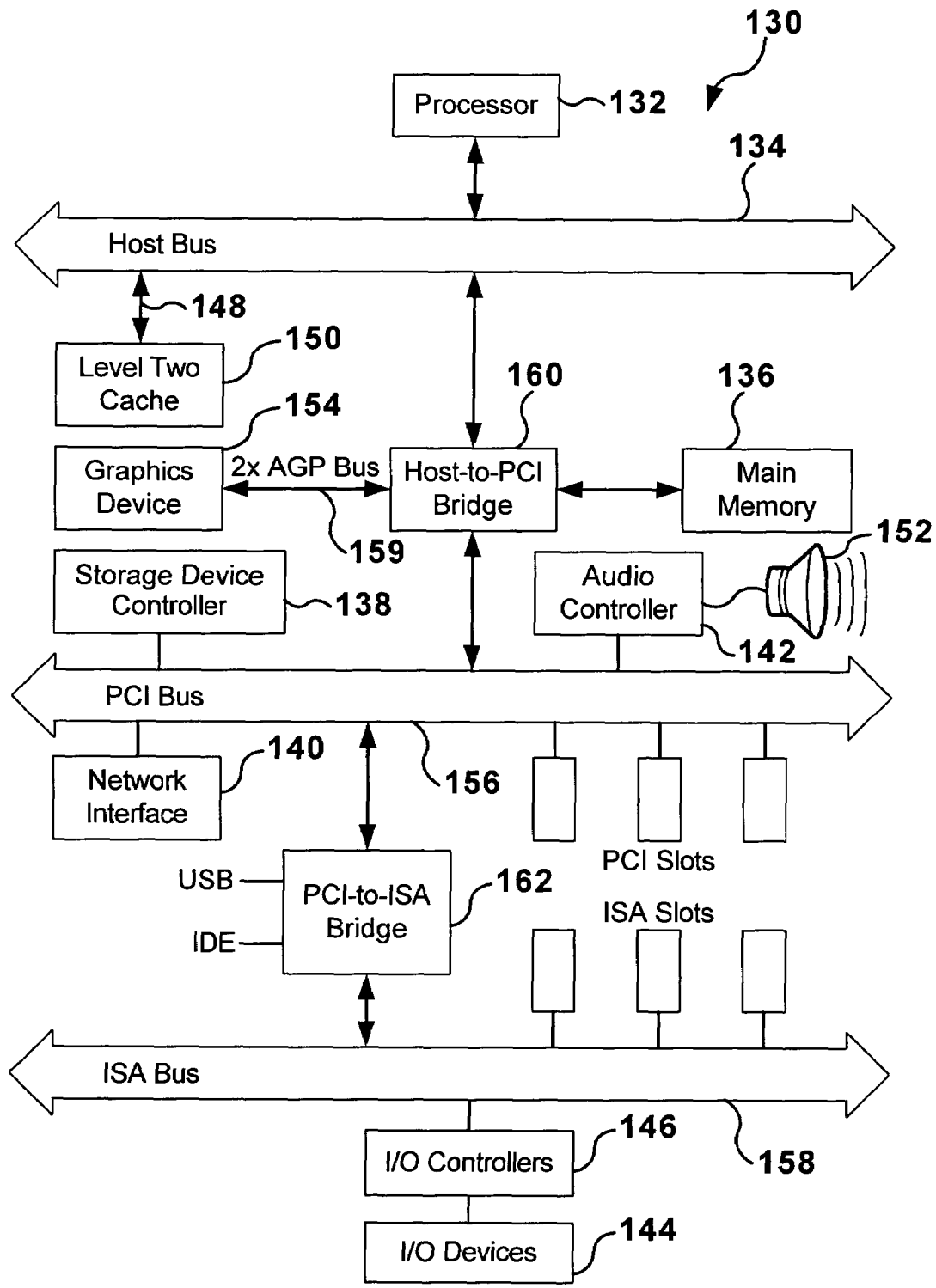
FIG. 1a is a block diagram of a computer system with which the present invention may be utilized.

The web servers 118, 120, 122, 124 execute a web server application program which monitors requests, services requests for the information on that particular web server, and transmits the information to the user's workstation 112. Workstation 112 and/or web servers 116 are computer systems, such as computer system 130 as shown in FIG. 1a. Computer system 130 includes central processing unit (CPU) 132 connected by host bus 134 to various components including main memory 136, storage device controller 138, network interface 140, audio and video controllers 142, and input/output devices 144 connected via input/output (I/O) controllers 146. Those skilled in the art will appreciate that this system encompasses all types of computer systems including, for example, mainframes, minicomputers, workstations, servers, personal computers, Internet terminals, network appliances, notebooks, palm tops, personal digital assistants, and embedded systems. Typically, computer system 130 also includes cache memory 150 to facilitate quicker access between processor 132 and main memory 136. I/O peripheral devices often include speaker systems 152, graphics devices 154, and other I/O devices 144 such as display monitors, keyboards, mouse-type input devices, floppy and hard disk drives, DVD drives, CD-ROM drives, and printers. Many computer systems also include network capability, terminal devices, modems, televisions, sound devices, voice recognition devices, electronic pen devices, and mass storage devices such as tape drives. The number of devices available to add to personal computer systems continues to grow, however computer system 130 may include fewer components than shown in FIG. 1a and described herein.

The peripheral devices usually communicate with processor 132 over one or more buses 134, 156, 158, with the buses communicating with each other through the use of one or more bridges 160, 162. Computer system 130 may be one of many workstations or servers connected to a network such as a local area network (LAN), a wide area network (WAN), or a global information network such as the Internet through network interface 140.

CPU 132 can be constructed from one or more microprocessors and/or integrated circuits. Main memory 136 stores programs and data that CPU 132 may access. When computer system 130 starts up, an operating system program is loaded into main memory 136. The operating system manages the resources of computer system 130, such as CPU 132, audio controller 142, storage device controller 138, network interface 140, I/O controllers 146, and host bus 134. The operating system reads one or more configuration files to determine the hardware and software resources connected to computer system 130.

Storage device controller 138 allows computer system 130 to retrieve and store data from mass storage devices such as magnetic disks (hard disks, diskettes), and optical disks (DVD and CD-ROM).

One skilled in the art will recognize that the foregoing components and devices are used as examples for sake of conceptual clarity and that various configuration modifications are common. For example, audio controller 142 is connected to PCI bus 156 in FIG. 1a, but may be connected to the ISA bus 138 or reside on the motherboard (not shown) in alternative embodiments. As further example, although computer system 130 is shown to contain only a single main CPU 132 and a single system bus 134, those skilled in the art will appreciate that the present invention may be practiced using a computer system that has multiple CPUs 132 and/or multiple busses 134. In addition, the interfaces that are used in the preferred embodiment may include separate, fully programmed microprocessors that are used to off-load computationally intensive processing from CPU 132, or may include input/output (I/O) adapters to perform similar functions. Further, PCI bus 156 is used as an exemplar of any input-output devices attached to any I/O bus; AGP bus 159 is used as an exemplar of any graphics bus; graphics device 154 is used as an exemplar of any graphics controller; and host-to-PCI bridge 160 and PCI-to-ISA bridge 162 are used as exemplars of any type of bridge. Consequently, as used herein the specific exemplars set forth in FIG. 1a are intended to be representative of their more general classes. In general, use of any specific exemplar herein is also intended to be representative of its class and the non-inclusion of such specific devices in the foregoing list should not be taken as indicating that limitation is desired.

A web page is primarily visual data that is intended to be displayed on the display monitor of the user's workstation 112. When web server 118 receives a web page request, it will transmit a document, generally written in a markup language such as HTML or XML, across communication link 116 to the requesting web browser 114. Web browser 114 interprets the markup language and outputs the web page to the monitor of user workstation 112. This web page displayed on the user's display may contain text, graphics, and links (which are addresses of other web pages.) These other web pages (i.e., those represented by links) may be on the same or on different web servers 116. The user can go to these other web pages by clicking on the links using a mouse or other pointing device. This entire system of web pages with links to other web pages on other servers across the world comprises the World Wide Web.

Style sheet mechanisms available in markup languages enable style elements to be consistent across web pages that are related to one another (e.g., web pages belonging to a web site of a particular corporation). For example, HTML uses cascading style sheets (CSS), SGML uses document style semantics and specification language (DSSSL), and XML uses extensible style language (XSL). XSL is a language for expressing style sheets in XML, i.e., to express how the structured content of an XML file should be styled, laid out, and paginated onto some presentation medium such as a window in a web browser or a set of physical pages in a book, report, pamphlet, or memo. XSL was developed because XML offers greater data display possibilities than HTML. XML lets authors mark up data with author-defined elements (opening and closing pairs of tags) that specify the nature of the data. This allows the developer to clearly organize customized data structures. The data elements can be displayed with consistent formatting in different places on one document or across a series of documents. XML inserts the datum in the appropriate location, and XSL allows for more complex formatting than style sheet mechanisms associated with other markup languages.

XML enables users to create unique tags that identify their information in more meaningful ways than simply applying a basic set of markup language tags to all documents. To accomplish this, XML provides a namespace feature, which allows the user to specify addresses to provide a unique context to tags and attributes.

An XSL style sheet processor accepts a document or data in XML and an XSL style sheet, and produces the presentation of that XML source content as specified by the style sheet. The presentation process includes transforming a source tree into a result tree (also known as tree transformation), and interpreting the result tree to produce a formatted presentation on a display or other media. By separating the style sheet and the data, style or formatting aspects may be modified without modifying data that is being rendered, and vice versa.

XSL transformation (XSLT) is a language for tree transformation which associates patterns with templates. A pattern is matched against elements in the source tree. A template is instantiated for a particular source element to create part of the result tree. When a template is instantiated, each instruction is executed and replaced by the result tree fragment that it creates. In constructing the result tree, elements from the source tree can be filtered and reordered, and arbitrary structure can be added. XSLT uses XML namespaces to distinguish elements that are instructions to the XSLT processor from elements that specify literal result tree structure.

A schema specifies the structure of an XML document and constraints on its content. XML defines rules for defining markup languages having tags, while a schema is a formal specification of the grammar for one markup language. A schema is useful for validating the document content and for describing the grammar of the language. The schema defines the elements that can appear within the document and the attributes that can be associated with an element. XML schemas are extensible and software developers are free to add their own elements and attributes to XML schema documents. It defines whether an element is empty or can include text. The schema can also define default values for attributes.

XML includes a feature known as the Document Object Model (DOM) which is an application programming interface (API) for HTML and XML documents. The DOM defines the logical structure of documents and the way a document is accessed and manipulated. In the DOM, programmers can build documents, navigate their structure, and add, modify, or delete elements and content. Many objects found in an HTML or XML document can be accessed, changed, deleted, or added using the DOM. Documents are modeled using objects, and the model encompasses not only the structure of a document, but also the behavior of a document and the objects of which it is composed. As an object model, the DOM identifies the interfaces and objects used to represent and manipulate a document, the semantics of these interfaces and objects including both behavior and attributes, and the relationships and collaborations among these interfaces and objects.

DESCRIPTION

Figure 2:
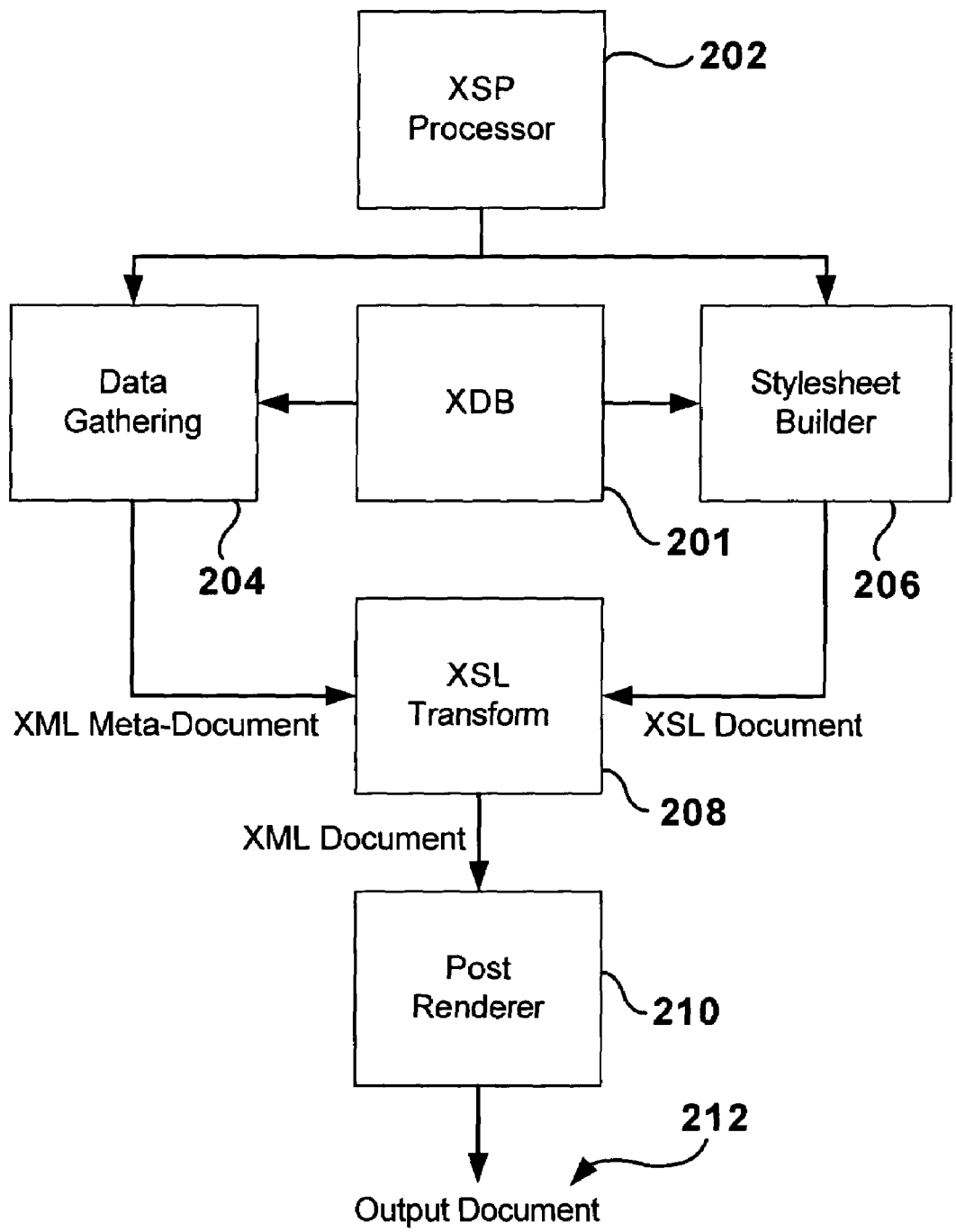
FIG. 2 is a block diagram of a device for generating XML documents according to the present invention.

FIG. 2 shows a block diagram of server pages processing apparatus 200 for generating and processing XML and XSL documents using XML server pages language (XSP) in accordance with the present invention. The present invention includes the XSP script language, XML database facilities (XDB) 201, and XSP processor 202 that interprets scripts written in XSP. XDB 201 resides in memory on web servers 116, 118, 120, 122, 124 (FIG. 1). The XSP language has control statements associated with it for accessing XDB 201 from a script. XSP processor 202 resides on web server 116 (FIG. 1), and on other web servers, as required.

One way to invoke XSP processor 202 is dynamically, through an online mechaninization wherein a user submits one or more XSP scripts from client workstation 112 (FIG. 1) to XSP processor 202 through an application program interface (API) on web server 116. Examples of commonly known interfaces to web server 116 that may be used include the Internet Services Application Programming Interface (ISAPI) and Common Gateway Interface (CGI). The resulting page is then transmitted back to client workstation 112 and is displayed or output to a selected target device, such as browser 114 (FIG. 1). Another way to invoke XSP processor 202 is statically, where a developer submits one or more XSP scripts to XSP processor 202 directly on server 116. The page or pages that result from server pages processing apparatus 200 are stored in server 116 and may be accessed by a client workstation 112 requesting the URL for the page.

An XSP script is a document written in XSP and XML that specifies one or more XML documents as input to XSP processor 202. The output of server pages processing apparatus 200 is an XML object that may be a well-formed markup language document that is ready to be input to a browser, or it may be expressed in another format that is ready for use in a data-interchange process with another system, or for formatting and delivery to an HTML or non-HTML client.

XSP script 300 is interpreted by XSP processor 202 as a set of subroutines that create XML structures in a result tree. The XML structures may be created by querying and transforming one or more XML data sources, or by direct inline coding of desired output as a template.

In one embodiment of XSP, all core functionality to support the structure of the result tree, whether it is an XML electronic data interchange (EDI) message, or a markup language document derived from an XML document, is implemented in low level "base" scripts. "User" scripts provide extensions and/or overwrite low level base scripts. The XML data sets referenced in user scripts determine the final result tree. This feature is known as the inheritance mechanism and it results in a very small number of compact scripts being able to support very large websites and a wide variety of actual document formats. Inheritance is an object oriented design feature which lets the user define some shared functionality, then override it in specific cases. Thus, a page may be divided into separate building blocks, with each block being generated by different XSP scripts. When a change is required in one block, only the affected scripts must be changed and the other blocks remain the same.

The inheritance mechanism also allows configuration control of page formats. For example, developers in different regions may be given access to blocks containing information that is unique to their region, such as information presented in a particular language, or different products that may be available in one region but not others. This allows software developers to change the information that is unique to them, while still maintaining commonality with scripts which generate the blocks that are common with other regions.

Referring back to FIG. 2, XSP processor 202 generates a first XSP script document that includes commands specifying XML resources containing the content desired for the page. The first XSP script document is output to data gathering process 204. Data gathering process 204 pulls the content from the sources specified in the first XSP script, and creates an XML meta-document for the message and content of the page. This XML meta-document is independent of the XML style sheet and is not targeted for any specific language or format.

Data gathering process 204 is capable of retrieving information from a variety of sources and allows developers in a particular region to specify the most relevant information to display on a given page. Developers may even provide some of the content that is unique to their area by utilizing user scripts, where allowed, while maintaining common content and format among all users using base scripts for the other portions of the page.

XSP processor 202 also generates a second document which includes a style sheet script for the page. Style sheet builder process 206 receives the style sheet script from XSP processor 202 and retrieves all of the documents specified in the style sheet script for formatting the content in the meta-document. The output of style sheet builder process 206 is an XSL document containing rules to format the meta-document.

The XSL document and the XML meta-document are input to XSL transform 208 which searches the hierarchy of modules specified in both the meta-document and the style sheet and uses the inheritance mechanism to determine which modules to utilize. A template is instantiated for the source elements specified in the module to create the result tree. When a template is instantiated, each instruction is executed and replaced by the result tree fragment that it creates.

The result tree fragments generated in XSL transform 208 are output to an XML document and sent to post renderer 210. Post renderer 210 converts the XML document to the document format required by the device or application software that will be used to display output document 212. Such document format may be one or more of many different formats including HTML, word processor formats, and WML, based on the target specified when an XSP script is initiated in XSP processor 202.

In accordance with the present invention, XSP scripts include statements for creating and accessing named and scoped variables, exercising flow control, instantiating and accessing COM objects, and creating XML data islands with script scope on a web server. XSP scripts share control structure syntax with XSL, but place the XSP control structure syntax in a different XML namespace to clarify whether XSP processor 202 executes the control structure, or whether the control structure is handled in another tier of server pages processing apparatus 200. XSP language and XSP processor 202 are further explained in co-pending U.S. patent application Ser. No. 09/399,451, entitled "XML Server Pages Language", which was filed on the same day, and is assigned to the same assignee, as the present application, and is hereby incorporated by reference.

The XSP language includes control statement <xsp:xdb> for enumerating all or part of XDB 201. XDB 201 includes an image, a link, and a definition database. While performing the enumeration, whenever a link, image, definition or variant node is found, the node's data block is expanded.

XDB 201 is a hierarchical database format that is accessed using XSP and translated into XML and XSL by data gathering process 204 and stylesheet builder 206. XDB 201 can be used to locate a piece of XML data using a hierarchical reference. This hierarchical reference is treated much like a path to a file in the hard disk file system. The reference is made up of a number of "folder" names, ending with a name to an actual resource within the final "folder". The resources and folders are all represented as XML. Folders can be specified both inline (inside the same XML file) and out of line in a separate file. This allows developers to build large, but manageable data structures using XDB.

XDB 201 begins with a single root file. An example of a root file for a database of links on a website is:

```
<xdb:xdb xmlns:xdb="uri:xdb">
  <!-- navigation folder is in nav.xdb -->
  <xdb:folder name="navigation" src="nav.xdb"/>
  <!-- products folder is inline -->
  <xdb:folder name="products">
  <xdb:resource name="home">
    <xdb:href>/products/default.htm</xdb:href>
    <xdb:caption>Products</xdb:caption>
  </xdb:resource>
  <xdb:resource name="widgets">
    <xdb:href>/products/widgets.htm</xdb:href>
    <xdb:caption>Widgets</xdb:caption>
  </xdb:resource>
  </xdb:folder>
</xdb:xdb>
```

This root file contains two folders: "navigation" and "products". The "navigation" folder is defined as being in a separate file called "nav.xdb". This file might then contain folders and link resources specific to navigation. The "products" folder, on the other hand, is shown inline. This folder contains two links—"home" and "widgets", each of which provides a physical link location and a simple caption for the link. The caption might be used to provide the text for a link in the case where none was explicitly specified where the link was being used.

Referencing a Resource

As mentioned previously, resource references to XDB 201 are similar to references to files in computer system 130 (FIG. 1a). The general form of a reference to a resource in XDB 201 is as follows:

[foldername1:] [foldername2: . . . ]resourcename

In this case, 'foldername1' is a folder within the root XDB file. 'foldername2' is a folder within 'foldername1' and 'resourcename' is the name of an xdb:resource within that folder.

As links can be placed directly into the root file of XDB 201, use of folder references are optional. For example, to get to the two links in the earlier example, the two product links would have these references:

```
products:home
   would return the link to /products/default.htm, and
products:widgets
   would return the link to /products/widgets.htm.
```

Definition of External Files

The navigation folder in the earlier example was defined in an external file called "nav.xdb". An example of such a file is:

```
<xdb:xdb xmlns:xdb="uri:xdb">
  <xdb:folder name="search">
    <xdb:resource name="home">
      <xdb:href>/search/default.asp</xdb:href>
      <xdb:caption>Search</xdb:caption>
    </xdb:resource>
    <xdb:resource name="sitemap">
      <xdb:href>/search/sitemap.htm</xdb:href>
      <xdb:caption>Site Map</xdb:caption>
    </xdb:resource>
  </xdb:folder>
</xdb:xdb>
```

A key point to note from this is that an external XDB folder file looks structurally identical to the root file—it is has the same kind of root node, and is made up of folders containing the same kind of resources (in this case, links). As the resources in this file are actually within the 'navigation' XDB folder, the resources in this file are referenced using a statement as follows:

```
navigation:search:sitemap
   which returns the link to /search/sitemap.htm.
```

Using Folder Defaults to Reduce Duplication

There is a high potential for duplication of data using the hierarchical XML-based approach of XDB 201. Three approaches to reducing duplication of data that may be implemented with the present invention are (1) folder defaults, (2) class definitions, and (3) soft links.

The simplest way to reduce duplication is to only have the data in the file once. For example, if all of the images in a particular folder are the same width and height, folder defaults provide a mechanism for specifying such information at the folder level.

In practice, without using a folder default, an image database in XDB 201 may look like this:

```
<xdb:xdb xmlns:xdb="uri:xdb">
    <xdb:resource name="home">
        <xdb:src>/images/masthead/home.gif</xdb:src>
        <xdb:width>100</xdb:width>
        <xdb:height>80</xdb:height>
        <xdb:caption>Search</xdb:caption>
    </xdb:resource>
    <xdb:resource name="products">
        <xdb:src>/images/masthead/products.gif</xdb:src>
        <xdb:width>100</xdb:width>
        <xdb:height>80</xdb:height>
        <xdb:caption>Products</xdb:caption>
    </xdb:resource>
</xdb:xdb>
```

When folder defaults are added, the preceding script becomes:

```
<xdb:xdb xmlns:xdb="uri:xdb">
    <xdb:default>
        <xdb:src>/images/masthead/.</xdb:src>
        <xdb:width>100</xdb:width>
        <xdb:height>80</xdb:height>
    </xdb:default>
    <xdb:resource name="home">
        <xdb:src>home.gif</xdb:src>
        <xdb:caption>Search</xdb:caption>
    </xdb:resource>
    <xdb:resource name="products">
        <xdb:src>products.gif</xdb:src>
        <xdb:caption>Products</xdb:caption>
    </xdb:resource>
</xdb:xdb>
```

Notice that when defaults are specified, the width, height and folder of the images in the folder are only specified once, at the folder level, greatly reducing size and maintenance overhead.

Using Class Definitions to Reduce Duplication

While folder defaults work well where all images in the folder broadly share the same set of defaults, marker class definitions are better suited to situations when the folder contains a number of different kinds of image. A class definition can be used to indicate a resource as being of a certain type or class. For example, an XDB database of an image resource might identify an image resource as being a "masthead button". A generalization could be formed for the "masthead button" class resource using the fact that the image is a certain width or height. As a result, that information does not need to be explicitly duplicated in the individual image resource. Further, there would be one place to maintain the shared data, and many resources in different folders can share the same class definition.

By way of example, consider the following script, which does not have a class definition:

```
<xdb:xdb xmlns:xdb="uri:xdb">
    <xdb:folder name="buttons">
        <xdb:resource name="home">
            <xdb:src>/images/masthead/home.gif</xdb:src>
```

```
            <xdb:width>100</xdb:width>
            <xdb:height>80</xdb:height>
            <xdb:caption>Search</xdb:caption>
        </xdb:resource>
        <xdb:resource name="desktopimage">
            <xdb:src>/images/pcpics/desktop.gif</xdb:src>
            <xdb:width>150</xdb:width>
            <xdb:height>130</xdb:height>
            <xdb:caption>Picture of a Desktop PC</xdb:caption>
        </xdb:resource>
        <xdb:resource name="notebookimage">
            <xdb:src>/images/pcpics/notebook.gif</xdb:src>
            <xdb:width>150</xdb:width>
            <xdb:height>130</xdb:height>
            <xdb:caption>Picture of a Notebook PC</xdb:caption>
        </xdb:resource>
    </xdb:folder>
</xdb:xdb>
```

In the preceding script, the image for the resource "home" has a different height and width than the images for the resources "desktopimage" and "notebookimage" in the same folder, so folder defaults are not an ideal solution for reducing duplication.

Using a class definition, however, the script file becomes:

```
<xdb:xdb classfile="imgclass.xdb" xmlns:xdb="uri:xdb">
    <xdb:folder name="buttons">
        <xdb:resource name="home" class="mastheadbtn">
            <xdb:src>home.gif</xdb:src>
            <xdb:caption>Search</xdb:caption>
        </xdb:resource>
        <xdb:resource name="desktopimage" class="pcpic">
            <xdb:src>desktop.gif</xdb:src>
            <xdb:caption>Picture of a Desktop PC</xdb:caption>
        </xdb:resource>
        <xdb:resource name="notebookimage" class="pcpic">>
            <xdb:src>notebook.gif</xdb:src>
            <xdb:caption>Picture of a Notebook PC</xdb:caption>
        </xdb:resource>
    </xdb:folder>
</xdb:xdb>
```

There is now no duplication of data, as the image resources obtain this information via the class definitions in the file "imgclass.xdb", which includes the following:

```
<!-- imgclass.xdb -->
<xdb:xdb xmlns:xdb="uri:xdb">
    <xdb:class name="mastheadbtn">
        <xdb:src>/images/masthead/.</xdb:src>
        <xdb:width>100</xdb:width>
        <xdb:height>80</xdb:height>
    </xdb:resource>
    <xdb:class name="pcpic">
        <xdb:src>/images/pcpics/.</xdb:src>
        <xdb:width>150</xdb:width>
        <xdb:height>130</xdb:height>
    </xdb:resource>
</xdb:xdb>
```

Note that this file contains a single definition of all the information previously duplicated. Also note that the class file is actually another file in XDB 201, and thus, the class file can contain folders and be split across several physical files just as any other XDB 210 hierarchy can.

Using Soft Links to Reduce Duplication

Often when building a hierarchical structure for XDB 201, a situation arises where it is difficult to determine whether a given resource belongs in one folder or another. For example, a folder that included a resource called "car" could go in a "transportation" folder or a "hobbies" folder. The resource may belong in both folders, but it is not desirable to simply duplicate the data in both folders.

In one embodiment of the present invention, a solution is to create a marker resource with the name of the resource, and assign a soft link to it. For example, an XDB 201 root file for a database of links appears as:

```
<xdb:xdb xmlns:xdb="uri:xdb">
  <xdb:folder name="transportation">
    <xdb:resource name="car">
      <xdb:href>/transport/car.htm</xdb:href>
      <xdb:caption>Car</xdb:caption>
    </xdb:resource>
  </xdb:folder>
  <xdb:folder name="hobbies">
    <xdb:resource name="driving" ref="transporation:car" />
  </xdb:folder>
</xdb:xdb>
```

In addition to the preceding example having two resources, the link feature could be used to build "libraries" of resources based on their type, then use these by reference elsewhere, such as where the resource should be used in a context other than its type, as in the "hobbies" example above.

Using Variants to Override Properties

All of the preceding examples result in a resource being allocated when requested in a script. There may be situations, however, when a substitute or default resource should be allocated if the resource specifically requested is not available. For example, a particular link to a resource containing text in German is requested, but it is not available. The present invention provides a mechanism referred to a "variants" for allocating a resource that includes the text in some other language, for example, English, rather than having no resource allocated at all.

A variant provides a set of override properties In the preceding example above, the German variant of the caption could be specified on a given link as follows:

```
<xdb:xdb xmlns:xdb="uri:xdb">
  <!-- products folder is inline -->
  <xdb:folder name="products">
    <xdb:resource name="home">
      <xdb:href>/products/default.htm</xdb:href>
      <xdb:caption>Products</xdb:caption>
      <xdb:variant name="de">
        <xdb:caption>Produkte</xdb:caption>
      </xdb:variant>
    </xdb:resource>
</xdb:xdb>
```

In this case the Products page must be linked with the XDB reference "products:home", but a variant with a name of "de" has been added. When the German variant of this link is desired, the link with the reference "products:home#de" is used. The '#' means that the subsequent text is a variant reference.

In the example above, if a French reference is requested using "products:home#fr", and no French variant is found, no variant override would occur and the text from the resource itself would be supplied.

The general syntax is for referencing a variant is:
  [foldername1:][foldername2: . . . ]resourcename[#variant1 [#variant2] . . . ]

As further levels of variants are added, they are nested within the given variant definition. For example, Swiss German text is requested using "products:home#de#ch" for the following XDB structure:

```
<xdb:resource name="home">
  <xdb:href>/products/default.htm</xdb:href>
  <xdb:caption>Products</xdb:caption>
  <xdb:variant name="de">
    <xdb:caption>Produkte</xdb:caption>
    <xdb:variant name="ch">
      <xdb:caption>Produkte (CH)</xdb:caption>
    </xdb:variant>
  </xdb:variant>
</xdb:resource>
```

Special Properties

Note that the paths in the examples above were also shared and collapsed. The way post renderer 210 handles this is by understanding certain special properties, which support path remapping.

The two special properties understood by the XSP processor 202 are:
  xdb:src—a file being used as the source of some data or image file; and
  xdb:href—a link to a physical resource such as a web page.

The naming of these properties was taken from HTML, which uses these names as attributes on image and anchor (link) elements respectively.

When post renderer 210 has a value for one of these properties from folder default or class definition, and the actual resource then goes to override it, post renderer 210 uses path remapping rules to remap the current value of the property to the new value by treating the new value as a relative path.

While the present invention is described in the context of a fully functional computer system, those skilled in the art will appreciate that the present invention is capable of being distributed as a program product in a variety of forms, and that the present invention applies equally regardless of the particular type of signal bearing media used to actually carry out the distribution. Examples of signal bearing media include: recordable type media such as floppy disks and CD-ROM, transmission type media such as digital and analog communications links, as well as other media storage and distribution systems.

The present invention thus provides a database structure that may be utilized with the XSP language to extend XML's capabilities, i.e., to draw content and images from a variety of sources into one XML document. XSP processor 202 associated with the present invention interprets the control language and performs substitutions for and additions to content and style information in the script. The present invention further includes features for reducing duplication of data by providing control statements that access display information in one location that is common to several resources. The display information may include all or just a portion of content and image information for resources.

The present invention advantageously allows web page developers and other content providers to switch from editing numerous markup language files to implement a change to creating data forms using scripts that retrieve data and style information from common sources where possible. The present invention provides facilities for coordinating content and style development, and relieves developers from having to manually edit numerous files when a change is desired in either format or content, since the change may be made in XDB 201 that are referenced by XSP scripts and retrieved by data gathering process 204 and style sheet builder process 206. Developers responsible for providing content and styles that are unique to their individual environments may be given access to combine their own unique information and format where desired, and use shared information otherwise. Further, even when unique information is required, the present invention provides facilities (i.e., user scripts) that allow the information to be located in one location and used by all developers requiring access to it. The sharing of content and style information also facilitates presentation of up-to-date information in consistent formats.

While the invention has been described with respect to the embodiments and variations set forth above, these embodiments and variations are illustrative and the invention is not to be considered limited in scope to these embodiments and variations. Accordingly, various other embodiments and modifications and improvements not described herein may be within the spirit and scope of the present invention, as defined by the following claims.

What is claimed is:

1. A method for generating an XML document comprising:
generating a first file, the first file including one or more control statements, the one or more control statements reference at least one first resource, the first resource containing display information, wherein default display information is kept in the first resource;
executing a script, the script having a control statement referencing the first file, the execution of the script generating the XML document,
generating a marker resource, the marker resource associating a name with one or more second resources;
associating a link with the marker resource, the link referring to at least one of the one or more second resources;
providing display information in the at least one of the one or more second resources;
wherein two or more second resources can access the display information in the at least one of the one or more second resources, the display information composing a portion of the XML document; and
defining a variant for at least one of the one or more second resources, the variant providing a reference to override display information for the at least one of the one or more second resources,
wherein the method is performed by a computer system comprising at least one processor and a memory.

2. A computer system comprising:
a processor;
a nonvolatile memory coupled to the processor;
a data bus connected between the processor and the nonvolatile memory wherein the processor is configured to execute program instructions for generating an XML document, the program instructions including:
program instruction to execute a script, the script including at least one control statement for accessing display information, wherein the at least one control statement specifies at least one file, the at least one file providing information for accessing a plurality of resources for display information;
program instructions to generate the XML document using the display information from the plurality of resources; and
program instructions to execute control statements defining a variant for at least one resource, wherein the variant provides a reference to override display information for the at least one resource;
program instructions to execute control statements defining a marker resource that associates a name with the at least one resource,
program instructions to execute control statements further associating a link with the marker resource, and
program instructions to execute control statements further specifying the link when referring to the at least one resource, wherein at least two resources refer to the link to access the display information for the at least one resource.

3. The computer system of claim 2 further comprising:
program instructions operable to access a second file having a plurality of control statements for accessing a plurality of resources containing display information; and
program instructions operable to execute control statements in the second file for defining default display information, wherein the default display information is included with the display information for at least one of the resources.

4. The computer system of claim 2 further comprising:
program instructions to execute control statements for providing default display information for the class of resource; and
program instructions to execute control statements for including the default display information with the display information for each resource associated with the class.

5. A computer system comprising:
a processor;
a nonvolatile memory coupled to the processor;
a data bus connected between the processor and the nonvolatile memory wherein the processor is configured to execute program instructions for generating an XML document, the program instructions including:
first program instructions to execute a script, the script including at least one control statement for accessing display information, wherein the at least one control statement specifies at least one file, the at least one file providing information for accessing a plurality of resources for display information;
second program instructions to generate the XML document using the display information from the plurality of resources; and
third program instructions to execute control statements defining a variant for at least one resource, wherein the variant provides a reference to override display information for the at least one resource
fourth program instructions to execute control statements defining a marker resource that associates a name with the at least one resource,
fifth program instructions to execute control statements further associating a link with the marker resource, and
sixth program instructions execute control statements further specifying the link when referring to the at least one resource, wherein at least two resources refer to the link to access the display information for the at least one resource.

6. A computer program product for generating an XML document in a computer system, the computer program product comprising:
a server pages processor, the sewer pages processor configured to execute:

first program instructions to execute a script, the script including at least one control statement for accessing display information, wherein the at least one control statement specifies at least one file, the at least one file providing information for accessing a plurality of resources for display information;

second program instructions to generate the XML document using the display information from the plurality of resources;

third program instructions to execute control statements defining a variant for at least one resource, wherein the variant provides a reference to override display information for the at least one resource;

fourth program instructions to execute control statements defining a marker resource that associates a name with the at least one resource, fifth program instructions to execute control statements further associating a link with the marker resource, and sixth program instructions to execute control statements further specifying the link when referring to the at least one resource, wherein at least two resources refer to the link to access the display information for the at least one resource.

* * * * *